United States Patent [19]

Graber et al.

[11] Patent Number: 5,184,297

[45] Date of Patent: Feb. 2, 1993

[54] METHOD OF CALIBRATING POWER STEERING FOR UNIFORM VEHICLE-TO-VEHICLE STEERING EFFORT

[75] Inventors: David W. Graber, Millington; Dennis C. Eckhardt, Saginaw; Andrzej M. Pawlak, Troy; Bryan L. Faist, Frankenmuth, all of Mich.

[73] Assignee: General Motors Corporation, Detroit, Mich.

[21] Appl. No.: 602,568

[22] Filed: Oct. 24, 1990

[51] Int. Cl.⁵ .............................................. B62D 5/00
[52] U.S. Cl. .......................... 364/424.05; 364/571.04; 364/571.05; 180/142
[58] Field of Search ....................... 364/424.05, 571.01, 364/571.04, 571.05; 180/79.1, 140, 141, 142, 143; 280/91

[56] References Cited

U.S. PATENT DOCUMENTS

| | | | |
|---|---|---|---|
| 4,602,695 | 7/1986 | Takeshima et al. | 180/143 |
| 4,674,587 | 6/1987 | Suzuki et al. | 180/79.1 |
| 4,789,041 | 12/1988 | Takeshima et al. | 180/142 |
| 4,913,250 | 4/1990 | Emori et al. | 180/143 |

*Primary Examiner*—Gary Chin
*Attorney, Agent, or Firm*—Mark A. Navarre

[57] ABSTRACT

A power steering unit has an electromagnetic mechanism controlled by a computer-based controller for varying the steering effort in accordance with vehicle speed. The same controller is used to adjust the steering effort in accordance with a calibration value to obtain steering effort uniformity. The calibration value is obtained by applying a force to a vehicle wheel and measuring the resulting torque on the steering wheel (or vice versa) and comparing the resulting force to a standard. Any deviation from the standard is stored in the controller as a correction factor. Alternatively, the characteristics of the steering gear and the power steering pump are measured and encoded on the unit when manufactured and the encoded values are read after assembly in a vehicle and used to calculate the correction factor which is then stored in the controller.

3 Claims, 3 Drawing Sheets

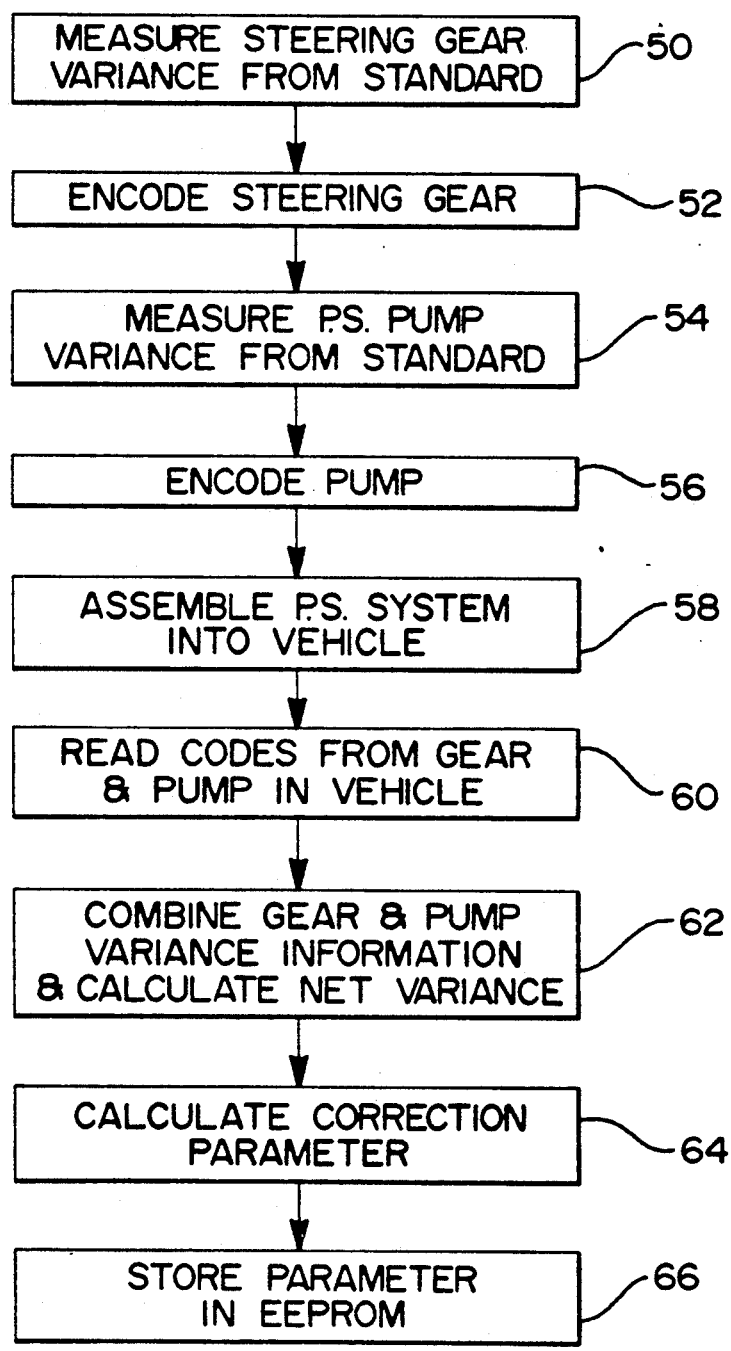

METHOD OF CALIBRATING POWER STEERING FOR UNIFORM VEHICLE-TO-VEHICLE STEERING EFFORT

FIELD OF THE INVENTION

This invention relates to power steering for automotive vehicles, and more particularly, to a method for adjusting each power steering system to provide uniform vehicle-to-vehicle steering effort.

BACKGROUND OF THE INVENTION

In a vehicle power steering system, a number of components are employed to assist in steering the wheels. The principal components are a hydraulic actuator to apply steering assist force to the wheels, a power steering pump to supply hydraulic fluid to the actuator, and a steering gear including a control valve to control the flow of fluid from the pump to the actuator in response to rotation of the steering wheel. Steering wheel rotation relatively moves two parts of the valve to admit fluid flow to the actuator. The steering gear employs a resilient element, such as a torsion bar, which resists the relative movement of the two parts of the valve to give feel or steering effort to the steering wheel.

For a given type of vehicle, it is desirable to have a particular steering effort to meet driver expectations. Manufacturing variables, however, lead to differences from one vehicle to another, so that the steering effort intended for a particular model is not always achieved. The variables chiefly arise from the resilient elements in the steering gears which may vary from one unit to another, and the power steering pumps which vary in output volume.

It has been proposed to control power steering effort by combining an electromagnetic actuator with the resilient element, so that the net effort is under electrical control, and may be greater or less than the resilient element alone. One such proposal is disclosed in U.S. Pat. No. 4,871,040 to Zuraski et al. issued Oct. 3, 1989, and assigned to the assignee of the present invention. The Zuraski et al. patent employs both a torsion bar and a magnetic spring comprising an electromagnetic device controlled by an electrical current coupled across the torsion bar to either enhance or counter the effect of the torsion bar as a function of the current magnitude and direction. The current is under control of a microcontroller programmed to vary the current in a prescribed manner. The principal purpose of the device cited by Zuraski et al. is to vary the current with vehicle speed to achieve low steering effort at low speeds and higher steering effort at high speeds. It is now proposed in the present invention to use a controllable steering effort system in the solution of the problem of vehicle-to-vehicle variability.

SUMMARY OF THE INVENTION

It is therefore an object of the invention to determine through measurement of system or component response, the variance from a norm of power steering effort and to compensate for the variance by setting a parameter in the controller of an electromagnetic mechanism which affects the steering effort.

The invention is carried out in a vehicle power steering system having an electrically controllable variable steering effort, by a method of calibrating vehicle power steering apparatus to a standard value of steering effort comprising the steps of: measuring the system response to an input force; determining the variance of the response from a standard value; calculating a correction value corresponding to the variance; storing the correction value; and controlling the variable steering effort in accordance with the correction value to at least partially compensate for the variance.

BRIEF DESCRIPTION OF THE DRAWINGS

The above and other advantages of the invention will become more apparent from the following description taken in conjunction with the accompanying drawings, wherein like references refer to like parts.

FIG. 5 is a flow chart illustrating an alternative calibration method according to the invention.

DESCRIPTION OF THE INVENTION

Figure 1:
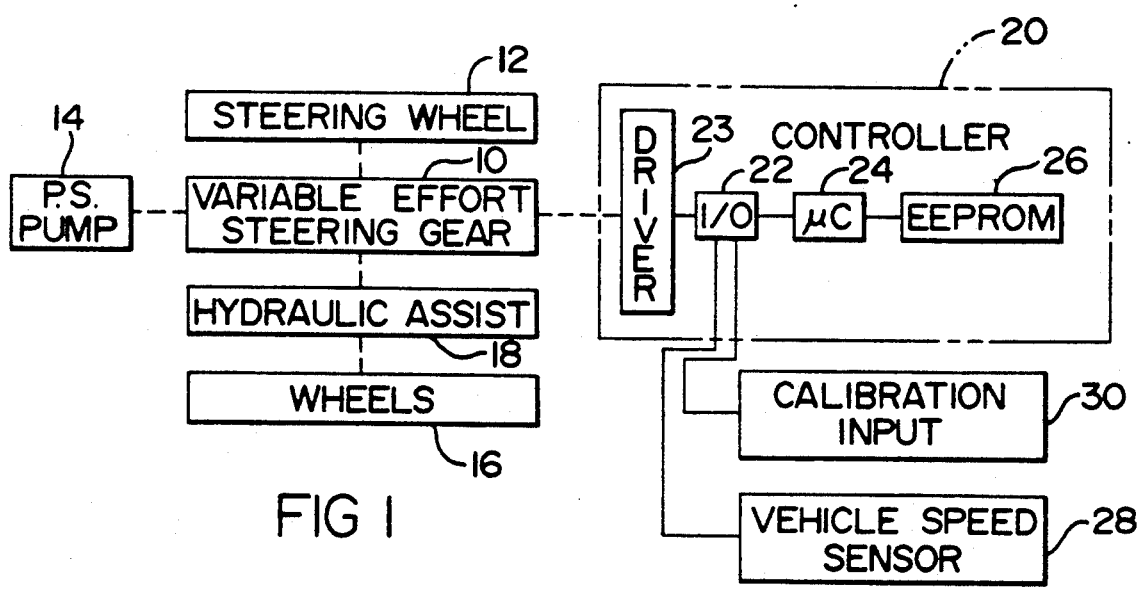
FIG. 1 is a block diagram of a variable effort power steering system subject to calibration according to the method of the invention.

FIG. 1 depicts the variable effort power steering system which is subject to calibration by this invention. The system is like that described in the above-mentioned U.S. Pat. No. 4,871,040 to Zuraski et al. or in the U.S. Pat. No. 4,886,138 to Graber et al. issued Dec. 12, 1989. A variable effort steering gear 10 is mechanically connected to a steering wheel 12 and is hydraulically connected to a power steering pump 14 and to the vehicle wheels 16 through a hydraulic assist or actuator 18, although a mechanical connection to the wheels is also maintained. A valve in the steering gear 10 controls the flow of hydraulic fluid to the hydraulic assist 18 according to the relative position of the steering wheel 12 and the wheels 16. A torsion bar (not shown) biases the valve to a center position and provides steering effort when the steering wheel is turned to move the valve.

The steering gear 10 includes an electromagnetic mechanism responsive to a control current for varying the steering effort. Current in one direction increases the effort over that supplied by the torsion bar, and current in the other direction decreases the effort. A controller 20 supplies the control current and includes an input/output (I/O) circuit 22, a current driver 23, a microcontroller 24 and a nonvolatile memory, such as an EEPROM 26. The control current is coupled from the driver 23 to the steering gear 10. A vehicle speed sensor 28 supplies speed information to the microcomputer 24 through the I/O circuit 22 for use in varying the control current as a function of speed, thereby effecting greater steering effort at high speed. A calibration input 30 is provided to the I/O circuit 22 for supplying calibration parameters to the EEPROM 26. Those parameters are used by the microcontroller 24 in deriving correct control current values.

The value of the compensation parameter required to impart a standard steering effort to each power steering assembly is determined by measuring the system response when installed on a vehicle at the place of vehicle assembly, or by measuring characteristics of those components which introduce steering effort variations at the place of manufacture of the components. The measured response or characteristics are then compared to a standard or norm, and any difference is the basis of the compensation parameter.

Figure 2:
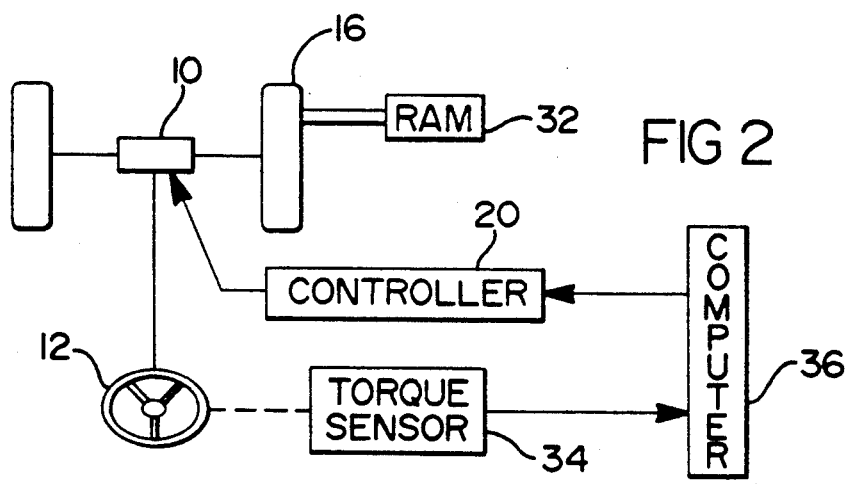
FIG. 2 is a schematic diagram of an apparatus applied to a vehicle for measuring system steering effort characteristics for carrying out the invention.

FIG. 2 shows measurement of system response for a system already installed on a vehicle. A calibrated ram 32 applies a preset force to a wheel 16. The force is transferred through the steering gear 10 to the steering wheel 12. The transfer function of the steering gear 10 determines the steering wheel torque which is the steering effort. The torque is measured by a torque sensor 34 attached to the steering wheel 12, and the measured value is submitted to a computer 36 in the form of tabulated data or a curve fitting approximation.

Figure 3:
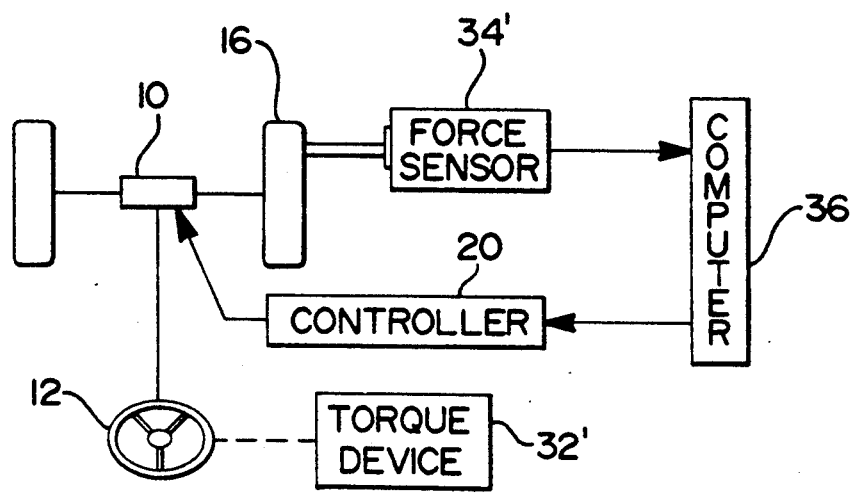
FIG. 3 is a schematic diagram of an alternative apparatus applied to a vehicle for measuring system steering effort characteristics for carrying out the invention.

The computer 36 is programmed to calculate from the measured torque values the variance from standard torque characteristics and the correction parameter required to bring the steering effort to the standard value. The correction parameter is submitted to the controller 20 via the calibration input 30 for permanent storage. The control current will then be adjusted by the controller according to the correction parameter to produce the standard steering effort. The equivalent results are obtained by an alternative process wherein a predetermined torque is applied to the steering wheel 12 by a torque device 32' and the resulting force on the wheel 16 is measured by a force sensor 34', as shown in FIG. 3.

Figure 4:
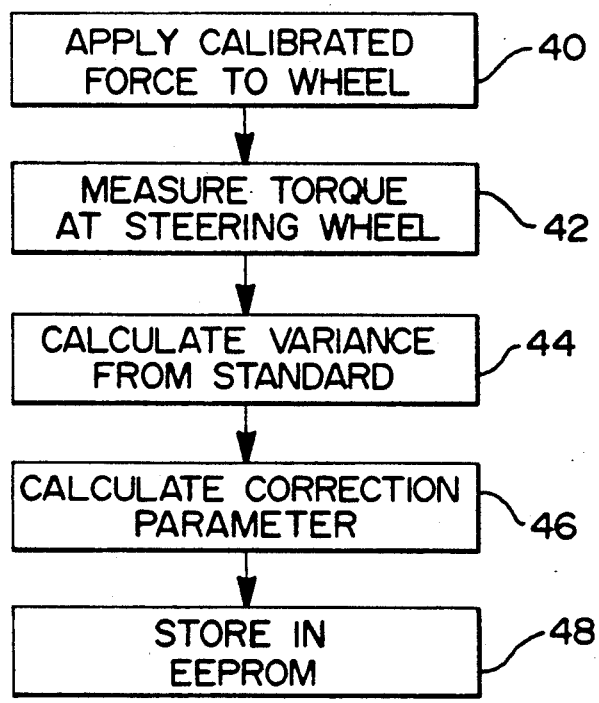
FIG. 4 is a flow chart illustrating the calibration method according to the invention.

The flow chart of FIG. 4 illustrates the calibration process for the embodiment of FIG. 2. At block 40, the calibrated force is applied to the wheel 16. The resulting torque on the steering wheel 12 is measured (block 42) and the value is fed to the computer 36 which calculates the variance from a standard value (block 44) and calculates the correction parameter (block 46) which is then transferred to the controller 20 which stores the correction parameter in the EEPROM 26 (block 48). Since this calibration involves measurement of the whole steering system, a complete correction is accomplished.

A partial compensation of system variability can be accomplished by measuring the characteristics of some key components and calculating a correction factor based on that information. It is convenient to measure the component characteristics at the time of manufacture, perhaps in conjunction with other measurements or testing of the component, and to affix a bar code or the like to the component which contains the necessary data. When the components are assembled into a vehicle, the codes are read and the information fed into the controller 20 of the power steering system. The microcontroller 24 would be programmed to convert the component characteristic information into a correction parameter which is permanently stored in the EEPROM 26.

The primary components to be measured for variability are the steering gear, which contains the torsion bar or other resilient element, and the power steering pump. The stiffness of the resilient element may vary from part to part, and the flow rate of the pumps may likewise vary. As outlined in the flow chart of FIG. 5, a system may be compensated for these components by measuring steering gear variance from standard (block 50), encoding the measured information into a bar code affixed to the gear (block 52), measuring power steering pump variance from standard (block 54), encoding the measured information into a bar code affixed to the pump (block 56), assembling the power steering system to a vehicle (block 58), reading the encoded information on the pump and steering gear for a particular vehicle (block 60) and entering the information into the microcontroller, combining the information and calculating the net variance from standard system characteristics (block 62), calculating a correction parameter (block 64) and storing the correction parameter in the EEPROM (block 66).

The power steering system, whether calibrated by the total system measurement or by the component measurement, stores the correction parameter and adjusts the system in response to the parameter by supplying suitable control current to achieve a steering effort consistent with the standard set for the vehicle model. If the unadjusted system has low or high steering effort, the control current will add to or subtract from the stiffness of the resilient element to reduce the variance from standard. In the case of the total system measurement, the variance is eliminated.

Figure 6:
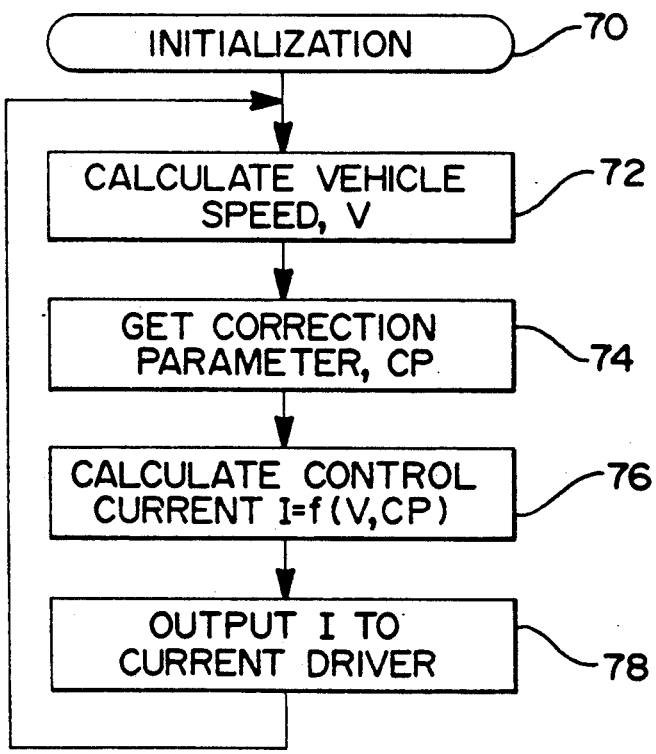
FIG. 6 is a flow chart illustrating the program of the controller of FIG. 1 for implementing steering effort correction.

FIG. 6 is a flow chart representing in simplified form, the program which controls the microcontroller 24. Although the calibration method is useful apart from a system which controls steering effort with vehicle speed, this example is for a program with speed control. The initialization block 70 designates a series of program instructions executed at the initiation of each period of vehicle operation for initializing the various registers and program variables to predetermined values. One of these variables is the correction parameter which is read from the EEPROM 26 and stored in the microcontroller 24. After initialization, the program repeatedly steps through the blocks 72-78. In block 72, the vehicle speed is determined from speed pulses received from the sensor 28 and admitted through the I/O circuit 22. Then, the correction parameter is read (block 74) and the control current is calculated as a function of vehicle speed and the correction parameter (block 76) and the result is output to the current driver 23 (block 78).

While this invention has been illustrated with regard to the illustrated embodiments, it is expected that various modifications will occur to those skilled in the art, and it should be understood that systems incorporating such modifications may fall within the scope of this invention which is defined by the appended claims.

The embodiments of the invention in which an exclusive property or privilege is claimed are defined as follows:

1. In a vehicle power steering system including a steering gear which develops steering assist force in response to an input force, and an electrically controllable variable steering effort mechanism for varying the developed steering assist force, a method of calibrating said system to a standard value of steering assist force comprising the steps of:
   measuring a steering assist force developed in response to an applied input force;
   determining a variance of the measured assist force from a standard value;
   calculating a correction value corresponding to said variance;
   storing the correction value; and
   controlling the variable steering effort mechanism in accordance with the correction value to at least partially compensate for said variance.

2. The invention as defined in claim 1, wherein the step of controlling the variable steering effort mechanism comprises the steps of calculating a control current on the basis of the correction value and applying said control current to said mechanism to control the steering assist force to the standard value.

3. The invention as defined in claim 1, wherein the measuring step is made after the steering system is installed in a vehicle having a steerable wheel and a steering wheel and includes applying an input force to one of the steerable wheel and steering wheel and sensing a developed force in the other of the steerable wheel and steering wheel.

* * * * *